(12) United States Patent
Chang et al.

(10) Patent No.: US 8,139,553 B2
(45) Date of Patent: Mar. 20, 2012

(54) METHODS AND APPARATUSES FOR LINK MANAGEMENT IN A SCATTERNET

(75) Inventors: Liang-Cheng Chang, Hisinchu (TW); Wei-Lun Wan, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 1105 days.

(21) Appl. No.: 11/972,797

(22) Filed: Jan. 11, 2008

(65) Prior Publication Data

US 2009/0180460 A1    Jul. 16, 2009

(51) Int. Cl.
*H04J 3/16* (2006.01)
(52) U.S. Cl. .......... 370/346; 370/314; 370/350
(58) Field of Classification Search .......... 370/314, 370/346, 350
See application file for complete search history.

(56) References Cited

U.S. PATENT DOCUMENTS

| | | | | |
|---|---|---|---|---|
| 6,026,297 | A * | 2/2000 | Haartsen | 455/426.1 |
| 7,260,638 | B2 | 8/2007 | Crosbie | |
| 7,450,577 | B2 * | 11/2008 | Johansson et al. | 370/386 |
| 7,454,171 | B2 * | 11/2008 | Palin et al. | 455/41.2 |
| 2003/0031208 | A1 | 2/2003 | Anehem et al. | |
| 2003/0036386 | A1 | 2/2003 | Harrison | |
| 2003/0140110 | A1 * | 7/2003 | Cho | 709/208 |
| 2004/0120341 | A1 | 6/2004 | Hur et al. | |
| 2004/0223482 | A1 | 11/2004 | Hong | |
| 2005/0188103 | A1 | 8/2005 | Chen | |

OTHER PUBLICATIONS

Bluetooth SIG "Specification of the Bluetooth System, vol. 1—Architecture & Terminology Overview" Version 2.1+EDR Jul. 26, 2007.*
Specification of the Bluetooth System—Wireless Connections Made Easy (pp. 169 and 170).

* cited by examiner

*Primary Examiner* — Dang Ton
*Assistant Examiner* — Robert M Morlan
(74) *Attorney, Agent, or Firm* — Thomas|Kayden

(57) ABSTRACT

An embodiment of a method for link management in a scatternet, performed by a wireless communication device, is provided. The wireless communication device simultaneously establishes a synchronization link in a first piconet, and an asynchronization link in a second piconet. The embodiment of the method contains the following steps. At least one time interval originally utilized for packet transmissions in the synchronization link is sacrificed. During the sacrificed time interval, the asynchronization link is switched to for a time period to maintain connection between the wireless communication device and a peer device operating with the asynchronization link.

18 Claims, 13 Drawing Sheets

METHODS AND APPARATUSES FOR LINK MANAGEMENT IN A SCATTERNET

BACKGROUND

The invention relates to link management, and more particularly, to methods and apparatuses for link management in a scatternet.

Bluetooth is a wireless personal area network (WPAN) standard for short-range transmission of digital voice and data. Bluetooth is widely used for hands-free mobile phone operations, such as connections between wireless headsets and Bluetooth-enabled automobiles that turn the car's audio system into a speakerphone. It can also be used to transfer data between mobile phones and computers. With the support of point-to-point and multipoint applications, Bluetooth provides up to 720 Kbps of data transfer within a range of 10 meters and up to 100 meters with a power amplifier. Digital voice and data are transmitted in the unlicensed 2.4 GHz band. Bluetooth technology uses a frequency hopping spread spectrum technique that changes its signal 800 times per second.

A piconet is an ad-hoc network of Bluetooth devices, similar with star-topology, to allow one master device to interconnect with up to seven active slave devices. The master device is operated as the central node and the slave devices are operated as dependent nodes. The timing of the piconet is controlled by the master device, and the slave devices synchronize their clocks with that of the master device. A scatternet is a set of piconets. When a slave device simultaneously participates in two or more piconets and the timings of the participating piconets are not synchronized, the slave device requires to switch to each piconet so as to maintain ACL (asynchronous connection oriented) link in each piconet. An ACL link associated with a piconet, however, may be automatically disconnected due to a certain number of polling timeouts. Thus, methods and apparatuses for link management in a scatternet are required to avoid exceptional disconnections.

SUMMARY

An embodiment of a method for link management in a scatternet, performed by a wireless communication device, is provided. The wireless communication device simultaneously establishes a synchronization link in a first piconet, and an asynchronization link in a second piconet. The embodiment of the method contains the following steps. First, at least one time interval originally utilized for packet transmissions in the synchronization link is sacrificed. During the sacrificed time interval, the asynchronization link is switched to for a time period to maintain connection between the wireless communication device and a peer device operating with the asynchronization link.

Additionally, an embodiment of an apparatus for link management in a scatternet is provided, comprising a radio frequency (RF) unit, a baseband unit coupling to the RF unit, and an MCU coupling to the baseband unit. The MCU sacrifices at least one time interval originally utilized for packet transmissions in the synchronization link via the RF and baseband units. During the sacrificed time interval, the MCU switches to the asynchronization link for a time period to maintain connection between the wireless communication device and a peer device operating with the asynchronization link.

BRIEF DESCRIPTION OF THE DRAWINGS

The invention can be more fully understood by reading the subsequent detailed description and examples with references made to the accompanying drawings, wherein.

DETAILED DESCRIPTION

Figures 1A, 1B:
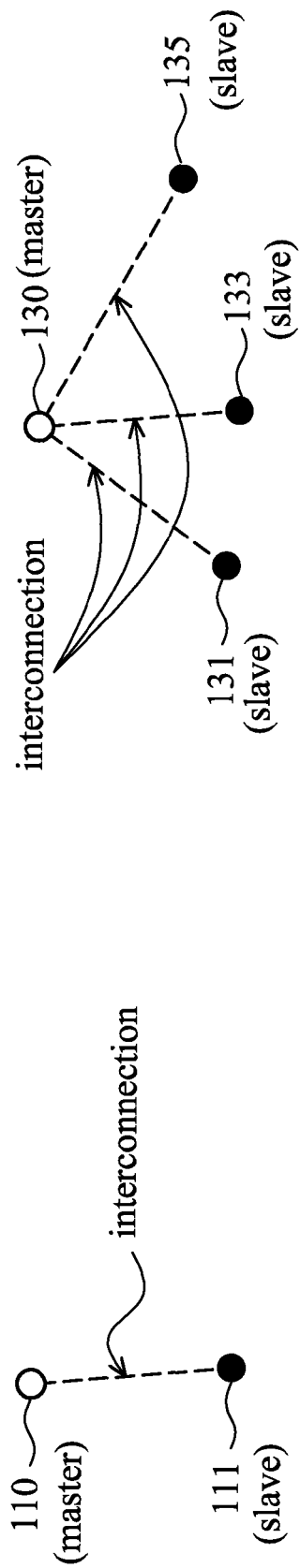
FIGS. 1A and 1B are schematic diagrams of embodiments of piconets.
Figure 2:
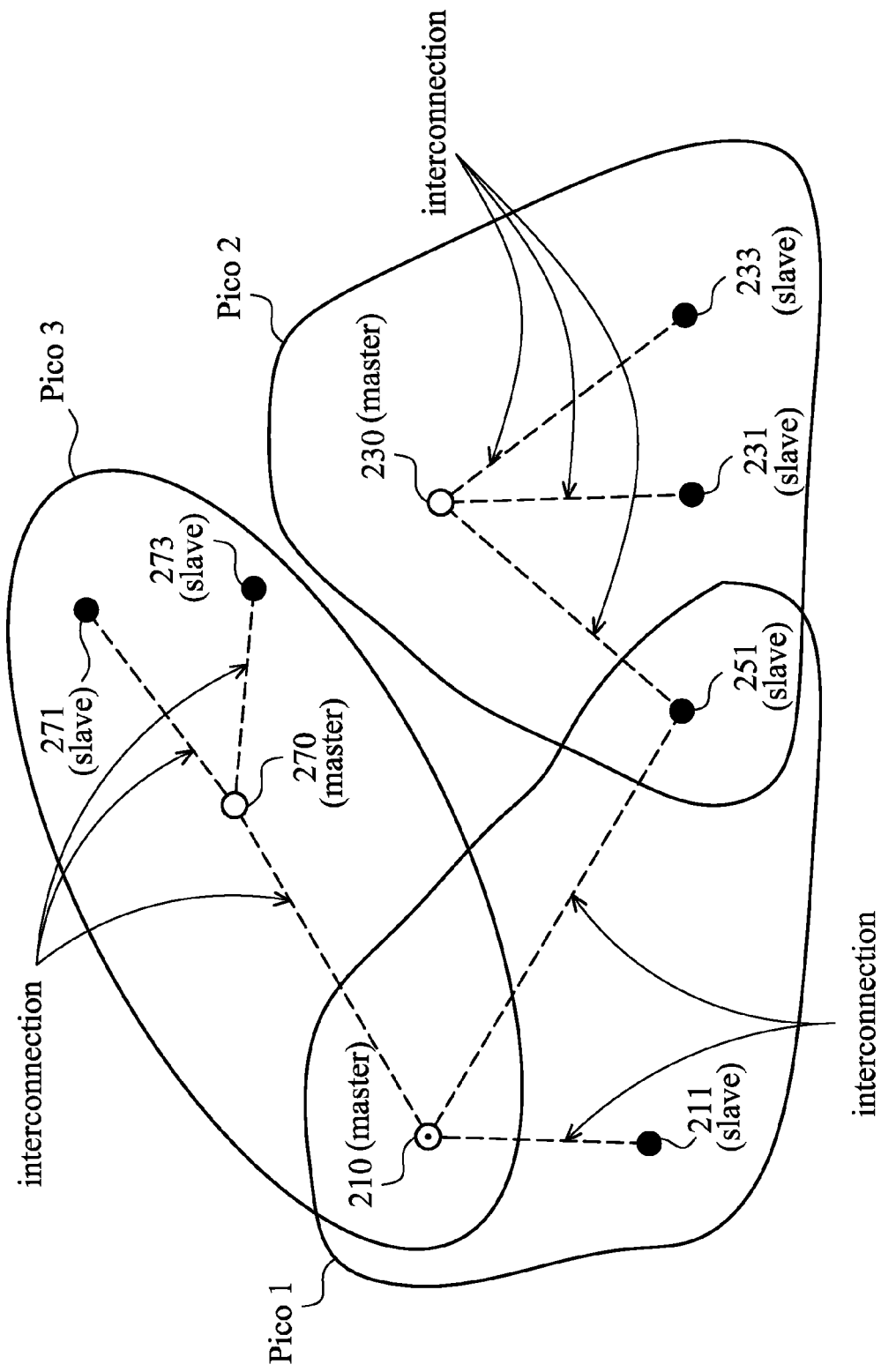
FIG. 2 is a schematic diagram of an embodiment of a scatternet.

FIGS. 1A and 1B are schematic diagrams of embodiments of piconets. In FIG. 1A, a master device 110 interconnects with a single slave device 111. In FIG. 1B, a master device 130 interconnects with three slave devices 131, 133 and 135. FIG. 2 is a schematic diagram of an embodiment of a scatternet comprising three partially overlapped piconets Pico1, Pico2 and Pico3. Timings are respectively controlled by three devices 210, 230 and 270 (also called master devices) without synchronization therebetween. Devices 211 and 251 are slave nodes connected to the master device 210, devices 251, 231 and 233 are slave devices connected to the master device 230, and devices 210, 271 and 273 are slave devices connected to the master device 270. The device 251 is concurrently a slave device of two piconets Pico1 and Pico2, using time division multiplexing (TDM) to interleave activities on each piconet physical channel. The device 210 simultaneously operates as a master device controlling the piconet Pico1 and a slave device connected to the master device 270 in the piconet Pico3. Two types of connections may be used for communication between a master device (e.g. one of 210, 230 and 270 of FIG. 2) and a slave device (e.g. one of 210, 211, 231, 233, 251, 271 and 273 of FIG. 2), the first, an SCO/eSCO (synchronous connection oriented/extended synchronous connection oriented) link, and second, an ACL (asynchronous connection oriented) link.

The SCO/eSCO link (also called synchronization link) is a symmetric, point-to-point link between a master device and a specific slave device. The master device maintains the SCO/eSCO link by using reserved slots at regular intervals. The master device can support a certain number of SCO/eSCO links to the same slave device or different slave devices. After establishing the SCO/eSCO link, some synchronous packets (such as HV and DV packets) are typically used for voice transmissions and are not retransmitted. The master node sends synchronous packets at regular intervals, for example, every 2, 4 or 6 slots, depending on packet type used for transmission. HV and DV packets are typically transmitted via the SCO link and EV packets are typically transmitted via the eSCO link.

The synchronous packets may carry voice at a specific rate such as 64, 96, 192, 288, 276 or 864 kbit/s. Exemplary types of synchronous packets are shown in Table 1.

TABLE 1

| Type | Payload Header (bytes) | User Payload (bytes) | FEC | CRC | Symmetric Max. Rate (kb/s) |
|---|---|---|---|---|---|
| HV1 | na | 10 | 1/3 | no | 64.0 |
| HV2 | na | 20 | 2/3 | no | 64.0 |
| HV3 | na | 30 | no | no | 64.0 |
| DV[1] | 1 D | 10 + (0-9) D | 2/3 D | Yes D | 64.0 + 57.6 D |
| EV3 | na | 1-30 | No | Yes | 96 |
| EV4 | na | 1-120 | 2/3 | Yes | 192 |
| EV5 | na | 1-180 | No | Yes | 288 |
| 2-EV3 | na | 1-60 | No | Yes | 192 |
| 2-EV5 | na | 1-360 | No | Yes | 576 |
| 3-EV3 | na | 1-90 | No | Yes | 288 |
| 3-EV5 | na | 1-540 | No | Yes | 864 |

Figure 3:
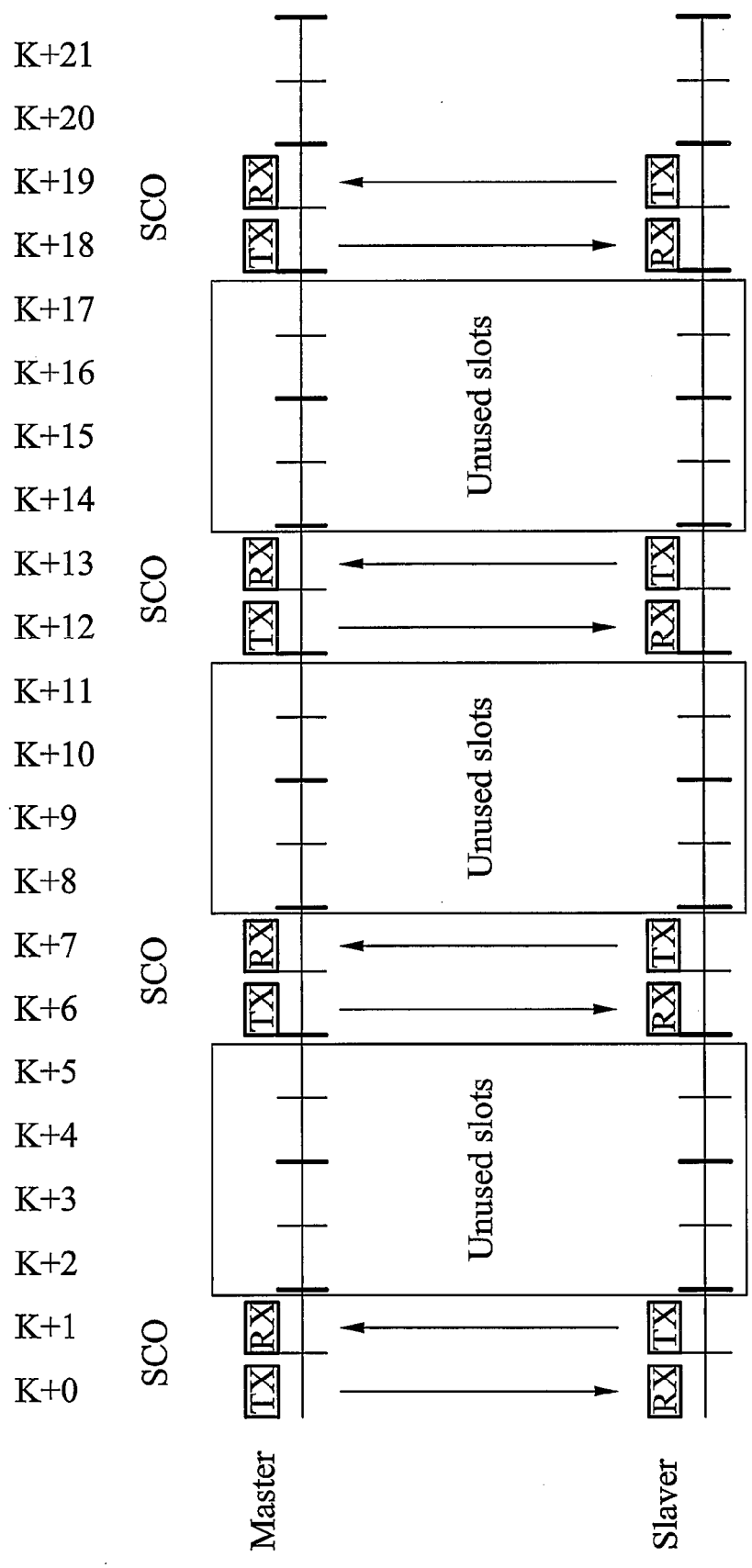
FIG. 3 is a schematic diagram illustrating HV3 packet transmissions at every six slots.

For example, HV1 packet carries 10 user payload bytes protected with 1/3 FEC (forward error correction). No CRC (cyclic redundancy check) is used. HV1 packet is sent at every two slots and carries 1.25 ms of speech at a 64 kb/s rate. HV2 packet carries 20 user payload bytes protected with a rate 2/3 FEC and is sent at every four slots. HV3 packet carries 30 unprotected user payload bytes and is sent at every six slots. FIG. 3 is a schematic diagram illustrating HV3 packet transmissions at every six slots. It is to be understood that four slots are unused between two HV3 packet transmissions. DV packet is combined data-voice packet. The user payload is divided into a voice field of 80 bits and a data field of up to 150 bits. The voice field is handled like normal voice data and is not retransmitted, and the data field is checked for errors and may be retransmitted if necessary. EV packets include a CRC and retransmission may be applied if no acknowledgement of packet reception is received within the retransmission window.

Figure 4:
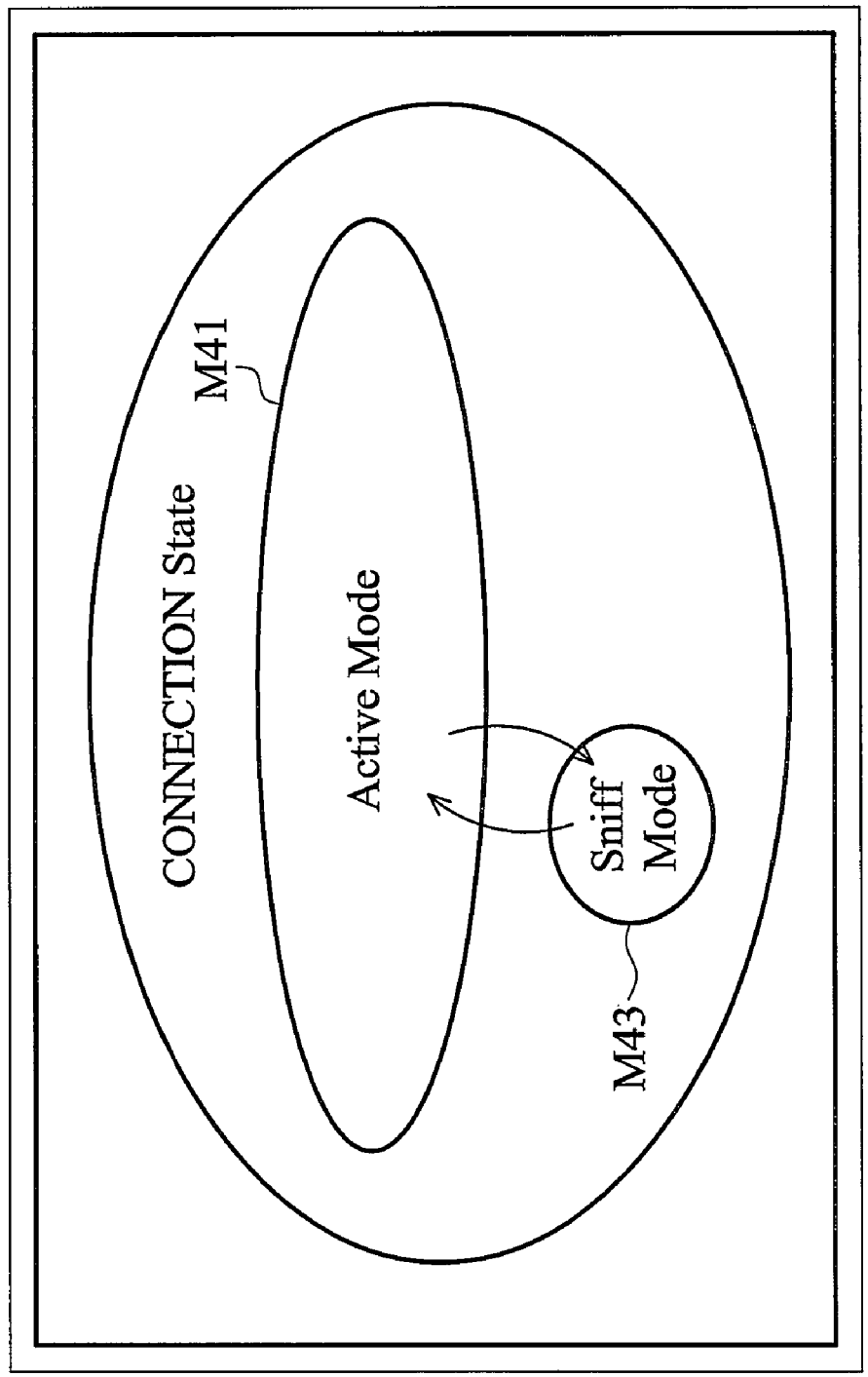
FIG. 4 is a diagram illustrating an exemplary connection state for the ACL link.
Figure 5:
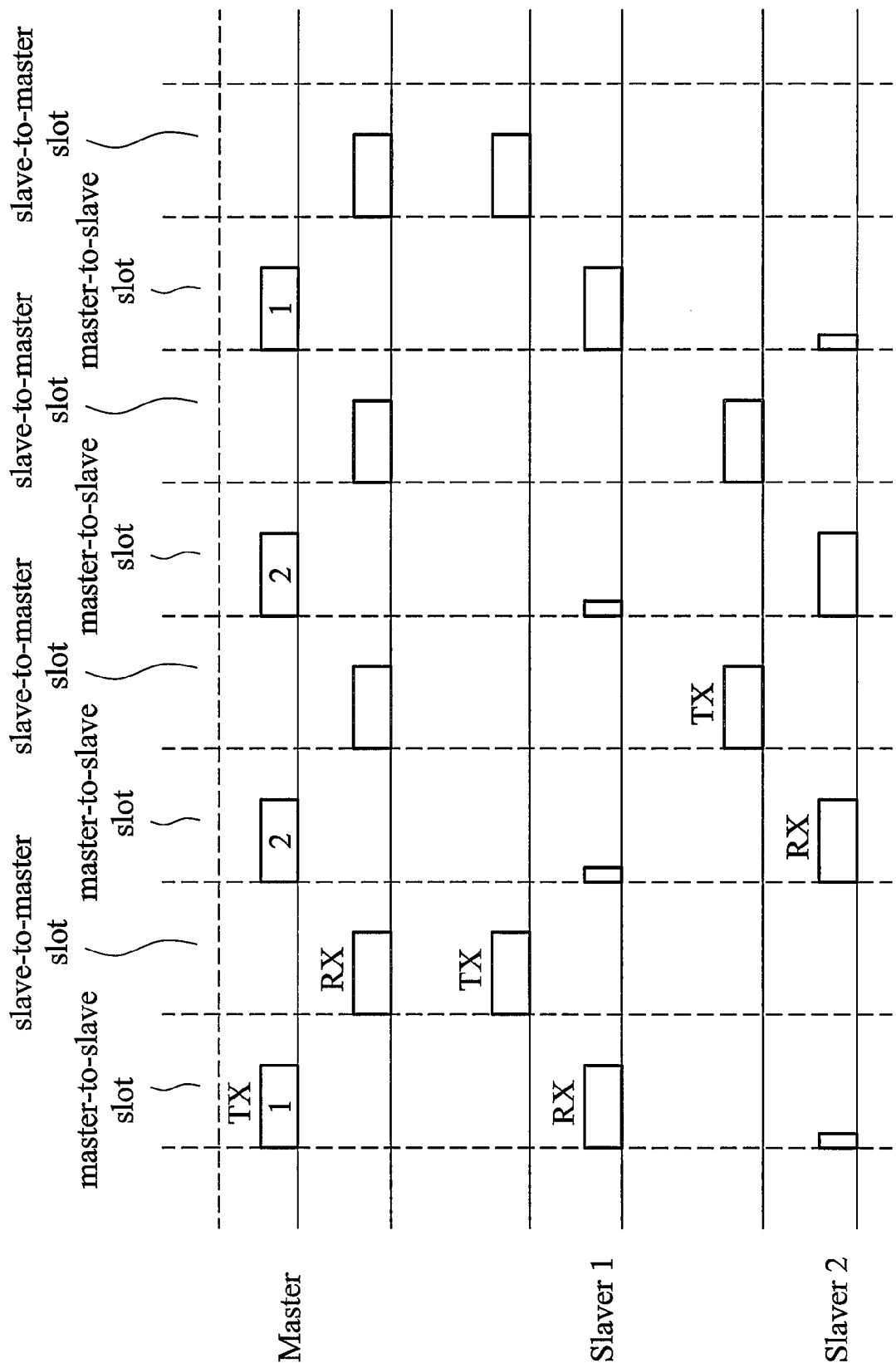
FIG. 5 is a diagram illustrating data transmissions among master and slave devices.
Figure 6:
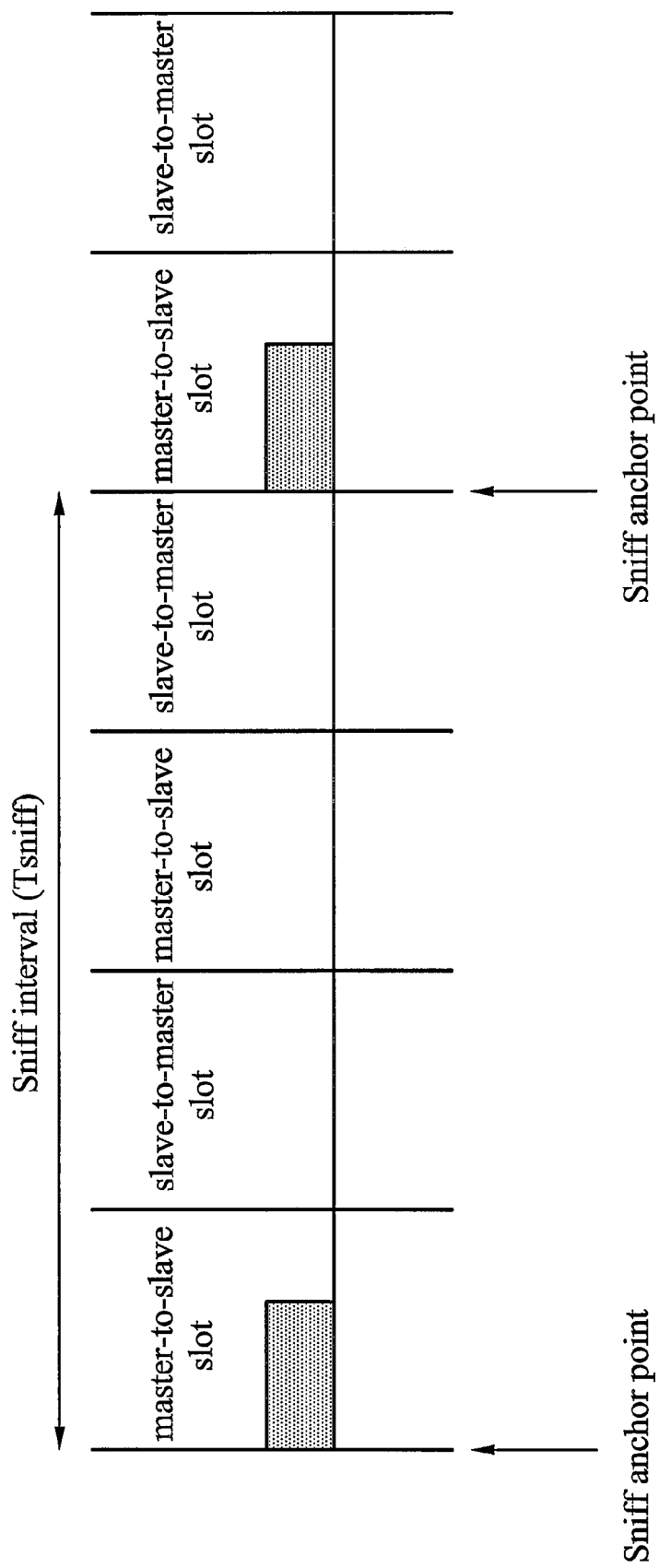
FIG. 6 is a diagram illustrating sniff anchor points.

The ACL link (also called asynchronization link) is a point-multipoint link between the master device and all slave devices participating on a piconet. No slot is reserved for the ACL link. The master device establishes an ACL link on a per-slot basis to any slave device, including the slave device already engaged in an SCO/eSCO link. After establishing the ACL link (i.e. entering connection state), ACL packets (such as DM, DH and AUX packets) are typically used for data transmissions. In addition, the master device regularly transmits packets to keep slave devices synchronizing to the channel. FIG. 4 is a diagram illustrating an exemplary connection state for the ACL link. During the active mode of connection state M41, both master and slave devices actively participate on a channel. The master device schedules the transmission based on traffic demands to and from different slave devices. If an active slave device is not addressed, the active slave device sleeps until the next master transmission. During sniff mode of connection state M43, the slots when a slave device listens to are reduced to save power consumption. Additionally, during sniff mode M43, the master device switches between transmitting and receiving packets to and from a slave device in sniff attempts containing 2, 4, 6, 8 slots or more, after reaching sniff anchor points. FIG. 6 is a diagram illustrating sniff anchor points. The sniff anchor points are regularly spaced with an interval of $T_{sniff}$. During active mode of connection state M41, a master device transmits data to a slave device in any of the master-to-slave slots. During sniff mode M43, a master device transmits data to a slave device in one or more of the master-to-slave slots of a sniff attempt after a sniff anchor point (e.g. a sniff attempt of Tsniff of FIG. 6 after a sniff anchor point). FIG. 5 is a diagram illustrating data transmissions among master and slave devices. In both active and sniff modes, a slave device transmits data to a master device in a slave-to-master slot after receiving data from the master device in a prior master-to-slave slot. A slave device may transmit a data packet (also referred to as transmitting data) or a null packet (also referred to as acknowledging) to a master device after receiving a poll/null packet (also referred to as polled by the mater node) or a data packet (also referred to as receiving data) from the master device. In order to prevent the ACL link from disconnection, during active mode M41, a slave device frequently listens in master-to-slave slots, and during sniff mode M43, a slave device listens in master-to-slave slots when reaching sniff anchor points. It should be noted that the ACL link to a slave device is automatically disconnected by a master device if no response is received after a predetermined number of pollings or transmissions, or for a predetermined time period.

Exemplary types of ACL packets are shown in Table 2.

TABLE 2

| Type | Payload Header (bytes) | User Payload (bytes) | FEC | CRC | Symmetric Max. Rate (kb/s) | Asymmetric Max. Rate (kb/s) | |
|---|---|---|---|---|---|---|---|
| | | | | | | Forward | Reverse |
| DM1 | 1 | 0-17 | 2/3 | yes | 108.8 | 108.8 | 108.8 |
| DH1 | 1 | 0-27 | no | yes | 172.8 | 172.8 | 172.8 |
| DM3 | 2 | 0-121 | 2/3 | yes | 258.1 | 387.2 | 54.4 |
| DH3 | 2 | 0-183 | no | yes | 390.4 | 585.6 | 86.4 |
| DM5 | 2 | 0-224 | 2/3 | yes | 286.7 | 477.8 | 36.3 |
| DH5 | 2 | 0-339 | no | yes | 433.9 | 723.2 | 57.6 |
| AUX1 | 1 | 0-29 | no | no | 185.6 | 185.6 | 185.6 |
| 2-DH1 | 2 | 0-54 | no | yes | 345.6 | 345.6 | 345.6 |
| 2-DH3 | 2 | 0-367 | no | yes | 782.9 | 1174.4 | 172.8 |
| 2-DH5 | 2 | 0-679 | no | yes | 869.1 | 1448.5 | 115.2 |
| 3-DH1 | 2 | 0-83 | no | yes | 531.2 | 531.2 | 531.2 |
| 3-DH3 | 2 | 0-552 | no | yes | 1177.6 | 1766.4 | 235.6 |
| 3-DH5 | 2 | 0-1021 | no | yes | 1306.9 | 2178.1 | 177.1 |

For example, DM1 packet carries up to 17 user payload bytes protected with a rate of 2/3 FEC. DM1 packet contains a 16-bit CRC code and is retransmitted when no acknowledgement is received. DM3 and DM5 packets are DM1 packets with extended user payload. DH1, DH3 and DH5 packets are similar to DM packets, except that the information in the user payload is not FEC encoded. AUX1 packet resembles a DH1 packet, but has no CRC code and is not retransmitted.

Figure 7:
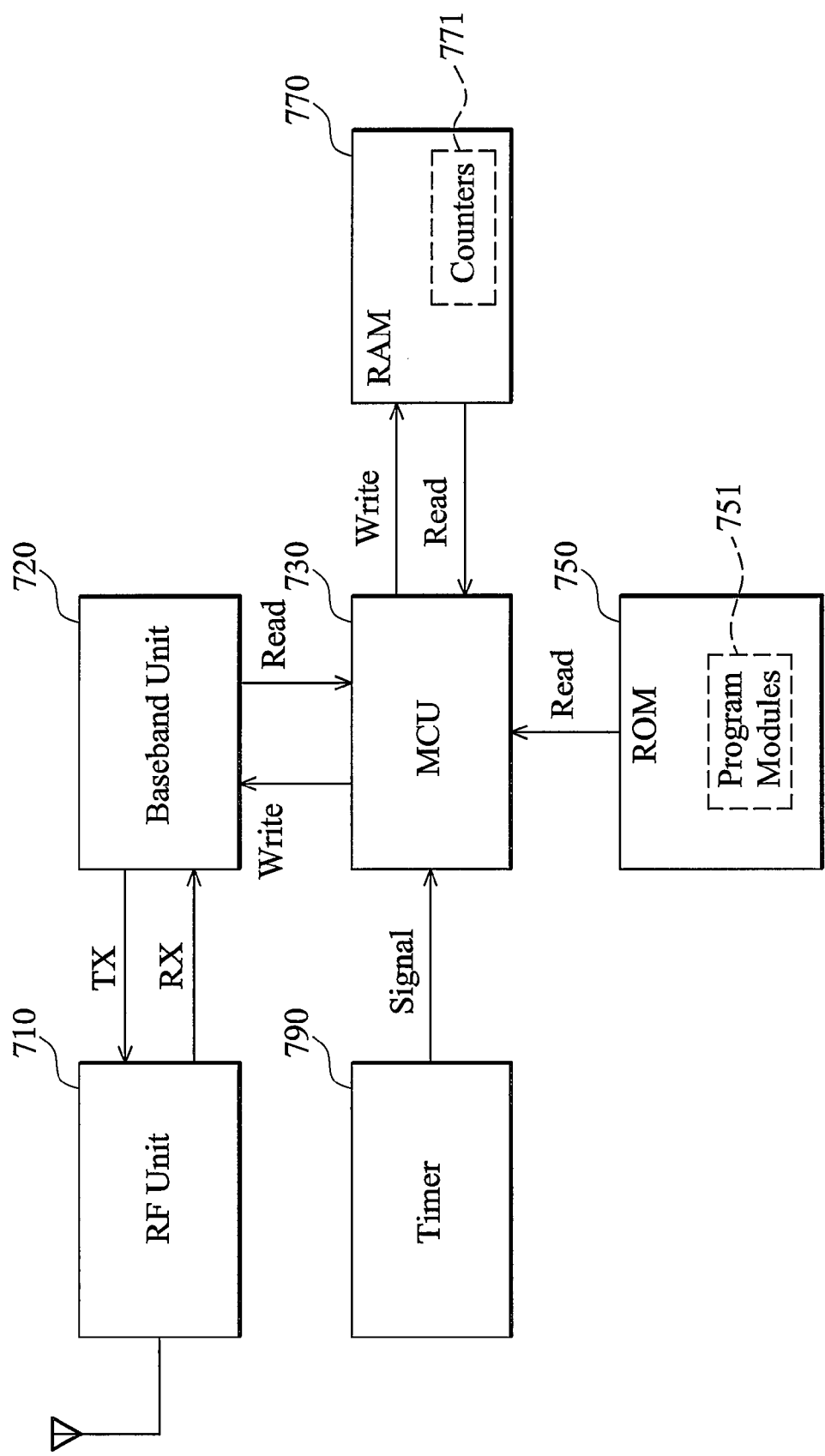
FIG. 7 is a schematic diagram of a hardware environment of an embodiment of a wireless communication device.

FIG. 7 is a schematic diagram of a hardware environment of an embodiment of a wireless communication device (e.g. 251 or 210 of FIG. 2) mainly comprising a radio frequency (RF) unit 710, a baseband unit 720, a microprocessor control unit (MCU) 730 (also referred to as processor), a read only memory 750 storing program code 751 (also referred to as non-volatile memory, in which program code and data will not be loss after power-down), a random access memory 770 (also referred to as volatile memory, in which data will be loss after power-down), a timer 790 and a antenna. It is to be understood that, in some embodiments, the MCU 730 may be practiced in the baseband unit 270. The MCU 730 loads and executes the program modules 751 of the ROM 750 to complete link management methods for a wireless communication device operating within two or more piconets. The link management methods may be periodically activated by the timer 790. The MCU 730 further maintains counters 771 of the RAM 770 during the link management methods. The RF unit 710 and the baseband unit 720 are utilized to wirelessly communicate with two or more master devices. Further detail of link management methods are to be described in the following.

Figure 8A:
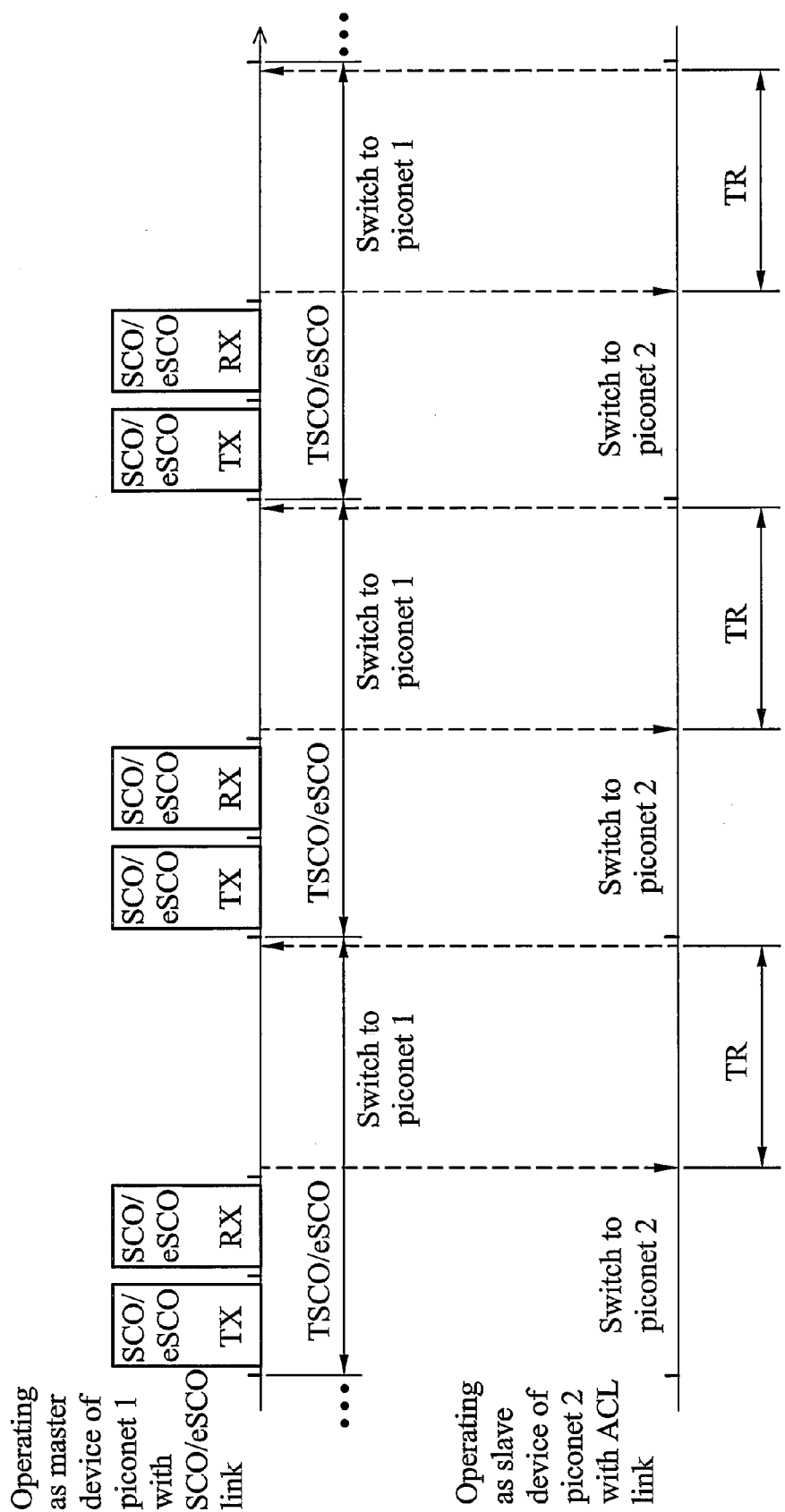
FIGS. 8A and 8B are schematic diagrams of embodiments of link management with both SCO/eSCO and ACL links in different piconets.
Figure 8B:
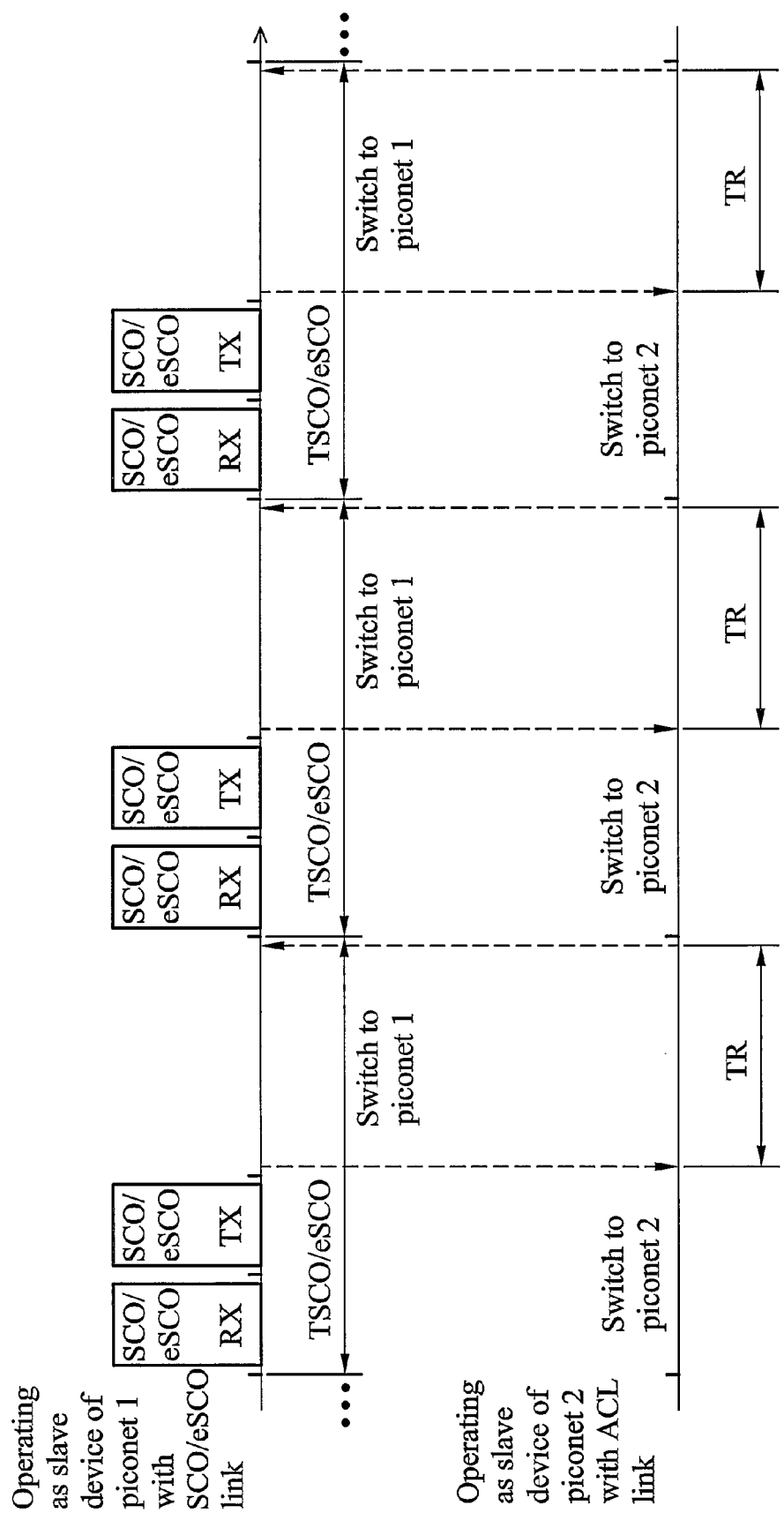

An embodiment of a link management method is provided. FIGS. 8A and 8B are schematic diagrams of embodiments of link management with both SCO/eSCO and ACL links in different piconets. Referring to FIG. 8A, FIG. 8A is a situation where a wireless communication device is operating as a master device of a piconet with an SCO/eSCO link and a slave device of another piconet with an ACL link (e.g. 251 of FIG. 2). Referring to FIG. 8B, FIG. 8B is a situation where a wireless communication device is operating as two slave devices respectively operating within different piconets, one communicating with an SCO/eSCO link and the other communicating with an ACL link (e.g. 251 of FIG. 2). The wireless communication device consumes several slots of each regular time interval $T_{SCO/eSCO}$ to transmit/receive voice or data to/from a slave or master device with established SCO/eSCO link (i.e. piconet 1). After completing HV/DV/EV packet transmission in each time interval $T_{SCO/eSCO}$, the wireless communication device switches to the ACL link (i.e. piconet 2) to listen to pollings or data (i.e. poll or data packets) from a master device until the current time from the end of the time interval is within a predetermined threshold. Since the SCO/eSCO link requires a periodic allocation of a pair of slots once every 2, 4 or 6 slots, little bandwidth is left for ACL traffic. However, a master device may poll or transmit data to the wireless communication device in the slots reserved for HV/DV/EV packet transmissions without direction. Automatic disconnection by the master device occurs if no response is received after a predetermined number of pollings or transmissions, or for a predetermined time period.

Figure 9A:
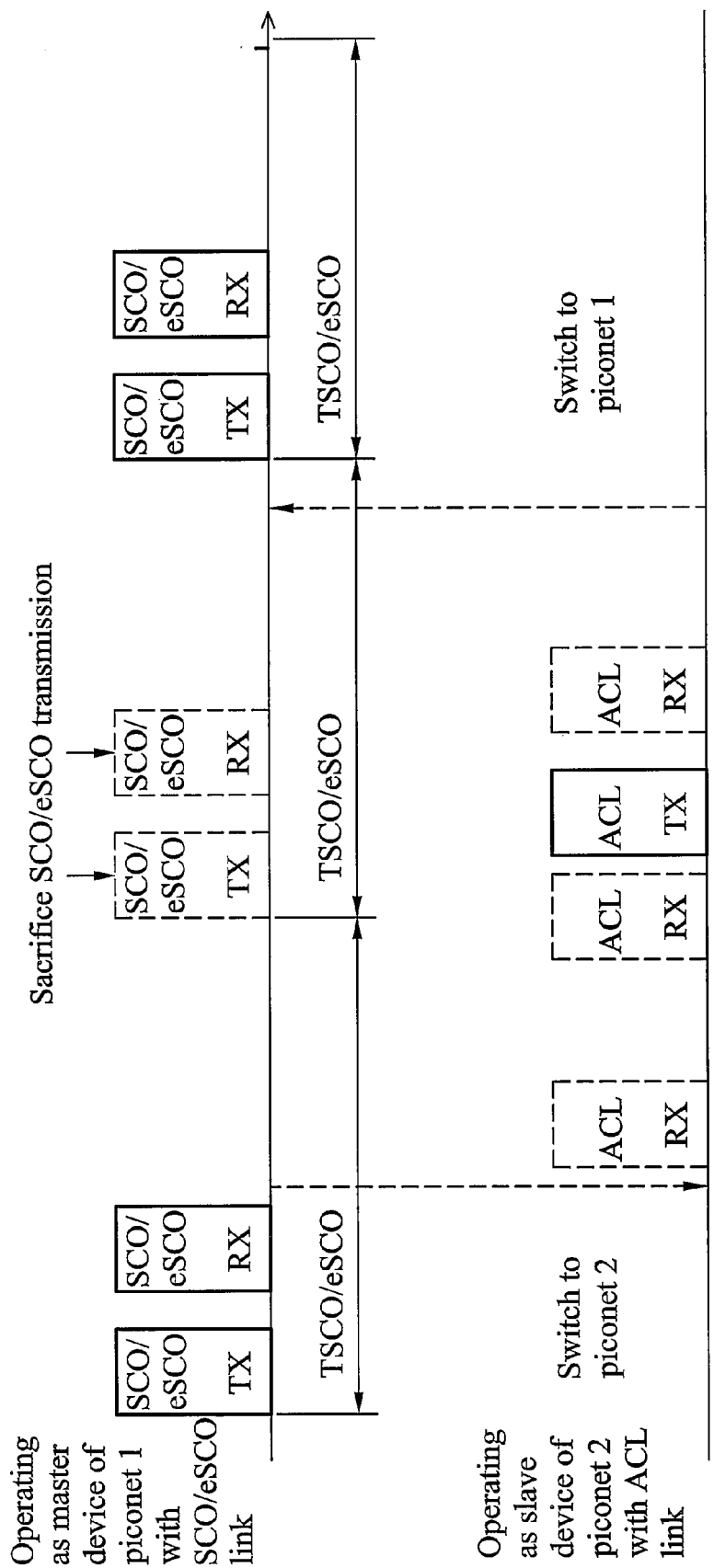
FIGS. 9A and 9B are schematic diagrams of embodiments of link management with both SCO/eSCO and ACL links in different piconets.
Figure 9B:
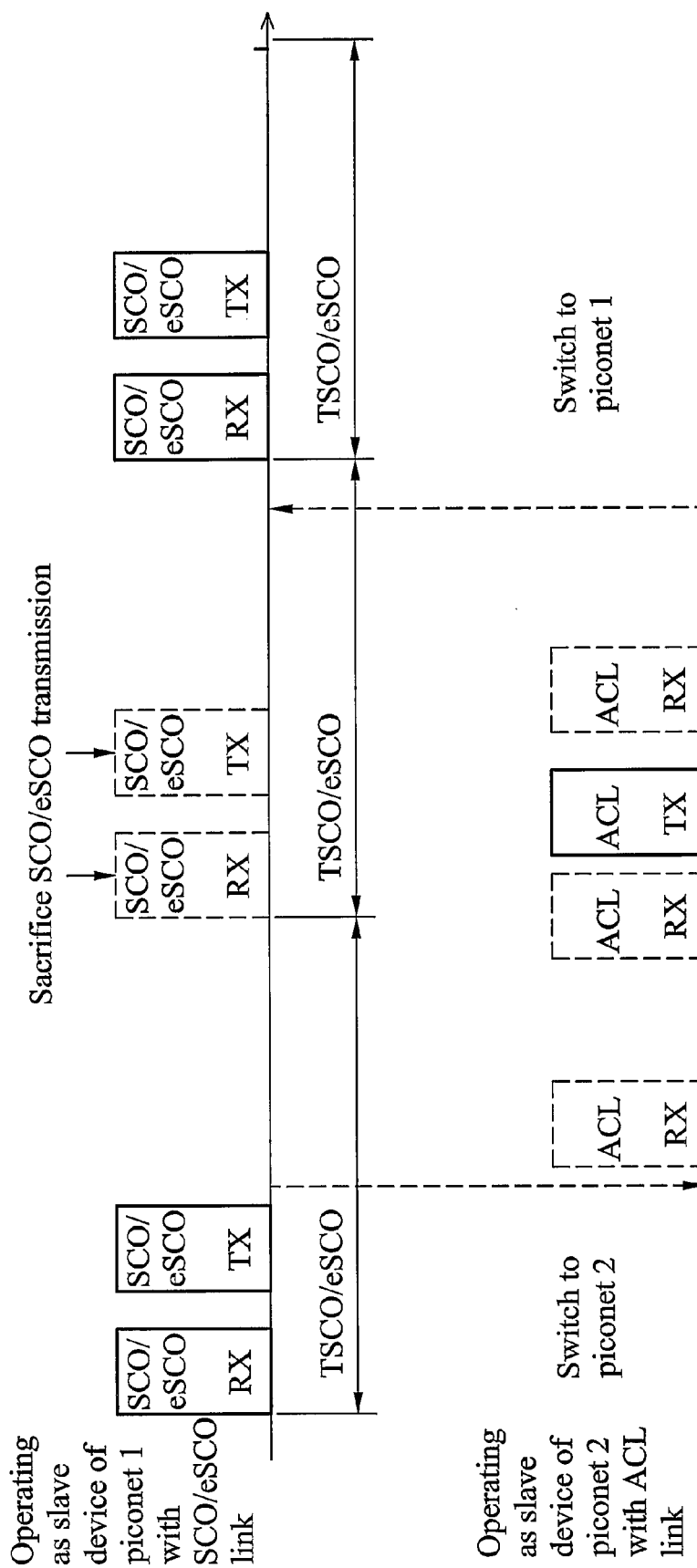

Another embodiment of a link management method is also provided. FIGS. 9A and 9B are schematic diagrams of embodiments of link management with both SCO/eSCO and ACL links in different piconets. Referring to FIG. 9A, a situation of a wireless communication device similar with that of FIG. 8A is shown. Referring to FIG. 9B, a situation of a wireless communication device similar with that of FIG. 8B is shown. In FIGS. 9A and 9B, the wireless communication device selectively sacrifices HV/DV/EV packet transmission in one or more time intervals $T_{SCO/eSCO}$ to listen to poll or data packets from a master device and transmit null or data packets thereto. Specifically, the wireless communication device switches to the ACL link (i.e. piconet 2) to listen to poll or data packets from a master device and transmit null or data packets thereto until approaching the end of a certain number of time intervals from the switching moment. After that, the wireless communication device switches to the SCO/eSCO link (i.e. piconet 1) to continue the interrupted HV/DV/EV packet transmission. Comparing to the embodiment illustrated in FIGS. 8a and 8b, the probability for listening to poll or data packets from a master device is increased by sacrificing a certain number of HV/DV/EV packet transmissions. It is to be understood that, acoustic samples encapsulated in the sacrificed HV/DV/EV packets may be interpolated according to the neighboring acoustic samples by a well-known algorithm to maintain the voice quality from dramatic reduction.

Figure 10A:
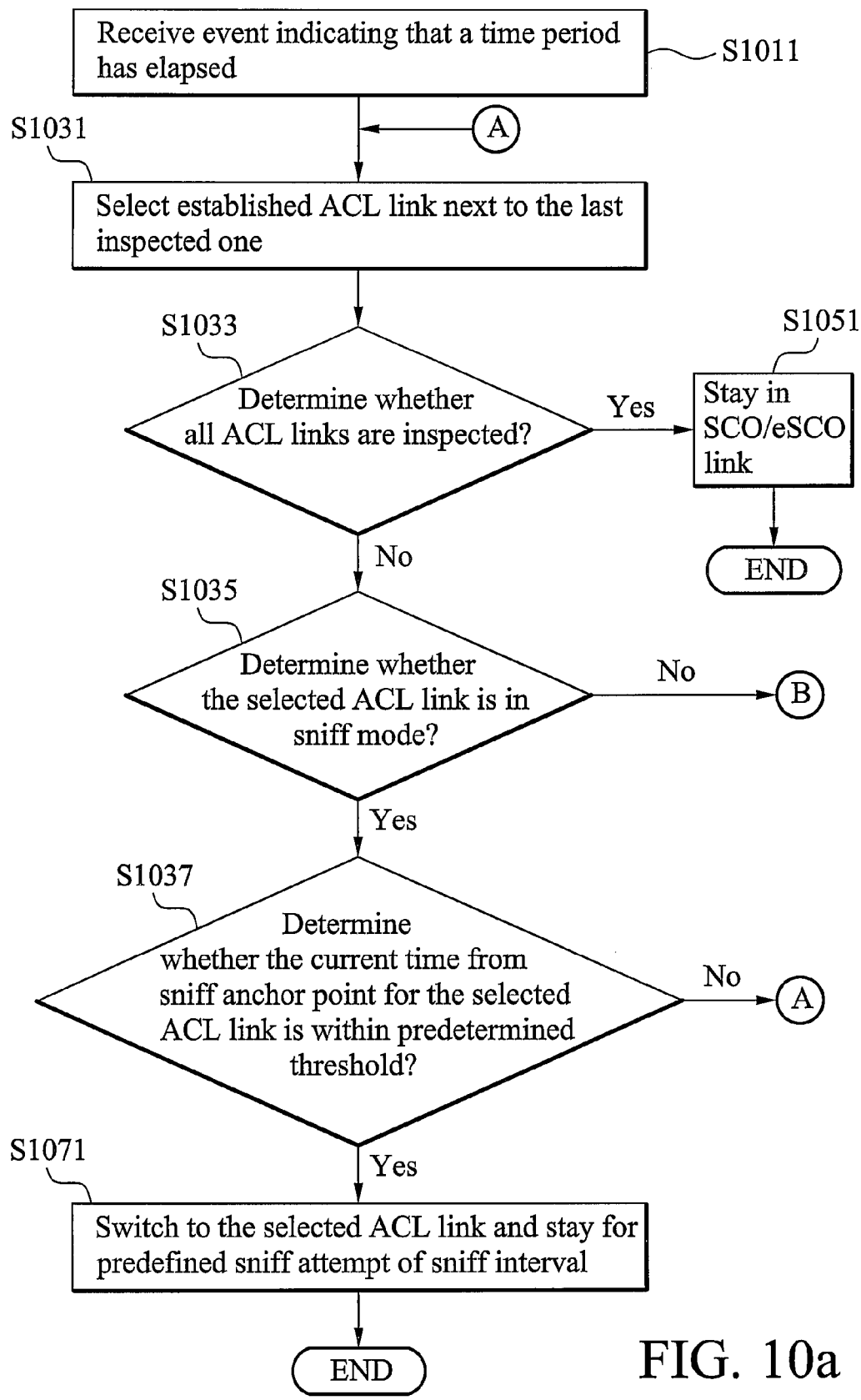
FIGS. 10A and 10B are flowcharts illustrating an embodiment of a link management method.
Figure 10B:
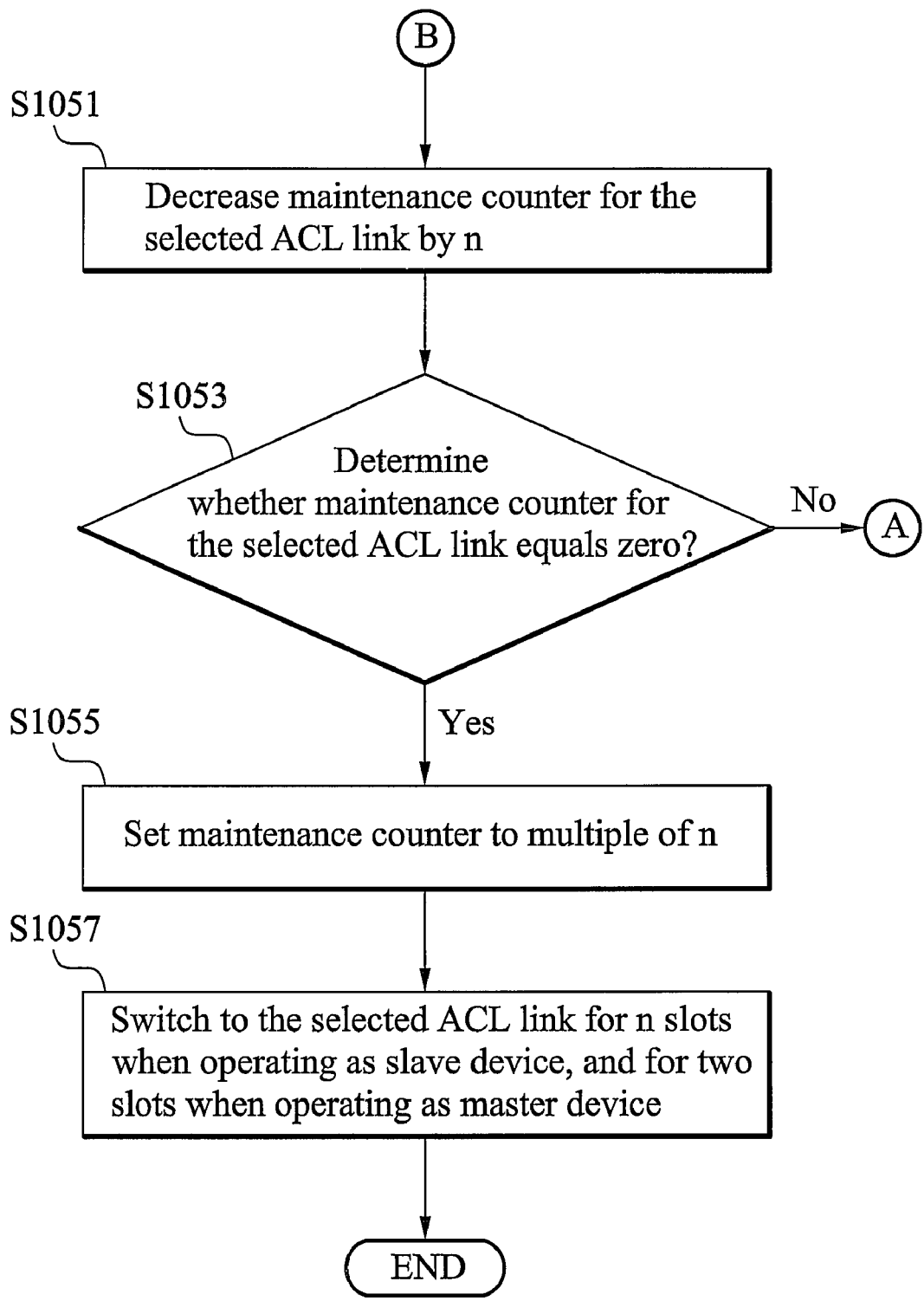

FIGS. 10A and 10B are flowcharts illustrating an embodiment of a link management method, performed by an MCU (e.g. 730 of FIG. 7) of a wireless communication device. The process is periodically activated by a timer (e.g. 790 of FIG. 9), such as every 30, 40, 50 milliseconds (ms), or others. When a wireless communication device simultaneously establishes at least one SCO/eSCO link in one piconet and at least one ACL link in another piconet, a timer is set to periodically issue a signal related to an elapsed predetermined time period. Note that implementation of the timer can be by a software program instead of hardware circuits. The process receives an event indicating that a time period has elapsed (step S1011). An established ACL link next to the last inspected ACL link is selected (step S1031). After selection, it is determined whether all ACL links are inspected (step S1033). If so (i.e. failure to select the next un-inspected ACL link), the process proceeds to stay in the SCO/eSCO link (step S1051), otherwise, subsequent steps for the selected ACL link (steps S1035 to S1057) is performed.

It is determined whether the selected ACL link is in a sniff mode (step S1035). If so, the process proceeds to steps S1037 to S1071, otherwise, to steps S1051 to S1057. When the selected ACL link is in a sniff mode, it is determined whether the current time from a sniff anchor point for the selected ACL link is within a predetermined threshold (step S1037). If so, a switch to the selected ACL link is conducted and remains for a predefined sniff attempt of a sniff interval (step S1071), otherwise, the process proceeds to step S031 to select the next un-inspected ACL link. During the predefined sniff attempt of the sniff interval for the selected ACL link, an RF unit (e.g. 710 of FIG. 7) and a baseband unit (e.g. 720 of FIG. 7) attempts to listen to poll or data packets from a master device and, if required, subsequently transmit null or data packets thereto via the selected ACL link.

When the selected ACL link is not in a sniff mode (i.e. in an active mode), a maintenance counter for the selected ACL link (e.g. one of 771 of FIG. 7) is decreased by n (step S1051). Thereafter, it is determined whether the maintenance counter for the selected ACL link equals zero (step S1053). If so, the maintenance counter is set to a multiple of n (step S1055) and it is switched to the selected ACL link for n slots when operating as a slave device with the selected ACL link, or for two slots when operating as a master device with the selected ACL link (step S1057), otherwise, the process proceeds to step S031 to select the next un-inspected ACL link. When operating as a slave device, during the n slots, an RF unit (e.g. 710 of FIG. 7) and a baseband unit (e.g. 720 of FIG. 7) attempts to listen to poll or data packets from a master device and, if required, subsequently transmit null or data packets thereto via the selected ACL link. When operating as a master device, during the 2 slots, an RF unit (e.g. 710 of FIG. 7) and a baseband unit (e.g. 720 of FIG. 7) attempts to transmit poll or data packets to slave devices and subsequently receive null or data packets therefrom via the selected ACL link.

Note that, when switching to the ACL link for a time period as shown in step S1071 or S1057, at least one time interval originally utilized for packet transmissions in the SCO/eSCO link may be sacrificed. For such sacrifice, referral may be made to descriptions relating to FIG. 9A or 9B.

Methods for link management, or certain aspects or portions thereof, may take the form of program codes (i.e., instructions) embodied in tangible media, such as floppy diskettes, CD-ROMS, hard drives, or any other machine-readable storage medium, wherein, when the program codes are loaded into and executed by a machine, such as a computer, a mobile phone, a smart phone or similar, the machine becomes an apparatus for practicing the invention. The disclosed methods may also be embodied in the form of program codes transmitted over some transmission medium, such as electrical wiring or cabling, through fiber optics, or via any other form of transmission, wherein, when the program codes are received and loaded into and executed by a machine, such as a computer, the machine becomes an apparatus for practicing the invention. When implemented on a general-purpose processor, the program codes combine with the processor to provide a unique apparatus that operate analogously to specific logic circuits.

Certain terms are used throughout the description and claims to refer to particular system components. As one skilled in the art will appreciate, consumer electronic equipment manufacturers may refer to a component by different names. This document does not intend to distinguish between components that differ in name but not function.

Although the invention has been described in terms of preferred embodiment, it is not limited thereto. Those skilled in the art can make various alterations and modifications without departing from the scope and spirit of the invention. Therefore, the scope of the invention shall be defined and protected by the following claims and their equivalents.

What is claimed is:

1. A method for link management in a scatternet, performed by a wireless communication device simultaneously establishing a synchronization link in a first piconet, and an asynchronization link in a second piconet, and the method comprising:
    sacrificing at least one time interval originally utilized for packet transmissions in the synchronization link; and
    during the sacrificed time interval, switching to the asynchronization link for a time period to maintain connection between the wireless communication device and a peer device operating with the asynchronization link,
    wherein the asynchronization link is in a sniff mode, the time period is a sniff attempt of a sniff interval, and the sniff attempt contains an even number of slots after a sniff anchor point of the sniff interval.

2. The method as claimed in claim 1 wherein the first piconet is not synchronized with the second piconet.

3. The method as claimed in claim 1 further comprising switching to the synchronization link and transmitting synchronization packets therein when the time from the end of the time period is within a predetermined threshold.

4. The method as claimed in claim 1 wherein the synchronization link is an SCO/eSCO (synchronous connection oriented/extended synchronous connection oriented) link, and the asynchronization link is an ACL (asynchronous connection oriented) link.

5. The method as claimed in claim 1 further comprising:
    determining whether the current time from the sniff anchor point of the sniff interval is within a predetermined threshold; and
    sacrificing the time interval when determining that the current time from the sniff anchor point of the sniff interval is within the predetermined threshold.

6. The method as claimed in claim 1 wherein the wireless communication device operates as a slave device of the second piconet, the asynchronization link is in an active mode, and the time period contains a number of slots.

7. The method as claimed in claim 6 further comprising:
    decreasing a maintenance timer for the asynchronization link by a value;
    determining whether the maintenance timer equals zero;
    setting the maintenance counter to a multiple of the value after determining that the maintenance timer equals zero;
    sacrificing the time interval when determining that the maintenance timer equals zero.

8. The method as claimed in claim 1 wherein the wireless communication device operates as a master device of the second piconet, the asynchronization link is in an active mode, and the time period contains two slots.

9. An apparatus comprising a radio frequency (RF) unit and a baseband unit coupling to the RF unit, for link management in a scatternet, simultaneously establishing a synchronization link in a first piconet, and an asynchronization link in a second piconet, and the apparatus further comprising:
    a microprocessor control unit (MCU) coupling to the baseband unit, sacrificing at least one time interval originally utilized for packet transmissions in the synchronization link via the RF and baseband units, and, during the sacrificed time interval, switching to the asynchronization link for a time period to maintain connection between the wireless communication device and a peer device operating with the asynchronization link,
    wherein the asynchronization link is in a sniff mode, the time period is a sniff attempt of a sniff interval, and the sniff attempt contains an even number of slots after a sniff anchor point of the sniff interval.

10. The apparatus as claimed in claim 9 wherein, in the time period, the MCU transmits a null or data packet to a master device of the second piconet via the RF and baseband units when listening to a poll or data packet from the master device via the RF and baseband units.

11. The apparatus as claimed in claim 9 wherein, in the time period, the MCU transmits a poll or data packet to a slave device of the second piconet via the RF and baseband units and subsequently receives a null or data packet from the slave device.

12. The apparatus as claimed in claim 9 wherein the MCU sacrifices the time interval after receiving a signal from a timer, indicating that a time period has elapsed.

13. The apparatus as claimed in claim 9 wherein at least one asynchronization packet is able to be retransmitted in the asynchronization link by the wireless communication device or the peer device.

14. The apparatus as claimed in claim 9 wherein all synchronization packets are unable to be retransmitted in the synchronization link by the wireless communication device or the peer device.

15. The apparatus as claimed in claim 9 wherein the MCU switches to the synchronization link and transmits synchronization packets therein when the time from the end of the time period is within a predetermined threshold.

16. The apparatus as claimed in claim 9 wherein the MCU determines whether the current time from the sniff anchor point of the sniff interval is within a predetermined threshold, and sacrifices the time interval when determining that the current time from the sniff anchor point of the sniff interval is within the predetermined threshold.

17. The apparatus as claimed in claim 9 wherein the wireless communication device operates as a slave device of the second piconet, the asynchronization link is in an active mode, and the time period contains a number of slots.

18. The apparatus as claimed in claim 9 wherein the wireless communication device operates as a master device of the second piconet, the asynchronization link is in an active mode, and the time period contains two slots.

* * * * *